(12) United States Patent
Venkumahanti et al.

(10) Patent No.: US 8,145,874 B2
(45) Date of Patent: Mar. 27, 2012

(54) SYSTEM AND METHOD OF DATA FORWARDING WITHIN AN EXECUTION UNIT

(75) Inventors: Suresh Venkumahanti, Austin, TX (US); Lucian Codrescu, Austin, TX (US); Lin Wang, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 668 days.

(21) Appl. No.: 12/037,300

(22) Filed: Feb. 26, 2008

(65) Prior Publication Data

US 2009/0216993 A1 Aug. 27, 2009

(51) Int. Cl.
G06F 12/10 (2006.01)
G06F 9/34 (2006.01)

(52) U.S. Cl. . 711/202; 711/169; 711/217; 711/E12.061; 712/218

(58) Field of Classification Search .......... 711/140, 711/169, 202, 207, 217, E12.014, E12.061; 712/218
See application file for complete search history.

(56) References Cited

U.S. PATENT DOCUMENTS

| | | | |
|---|---|---|---|
| 5,590,345 A | | 12/1996 | Barker et al. |
| 5,613,081 A | * | 3/1997 | Black et al. ........................ 711/3 |
| 5,751,983 A | | 5/1998 | Abramson et al. |
| 6,035,387 A | * | 3/2000 | Hsu et al. ...................... 712/210 |
| 6,343,359 B1 | | 1/2002 | Col et al. |
| 6,571,318 B1 | * | 5/2003 | Sander et al. .................. 711/137 |
| 6,615,340 B1 | | 9/2003 | Wilmot, II |
| 6,678,815 B1 | * | 1/2004 | Mathews et al. ............... 711/205 |
| 6,889,317 B2 | * | 5/2005 | Sami et al. ..................... 712/218 |
| 2001/0049772 A1 | * | 12/2001 | Choi et al. ..................... 711/138 |
| 2002/0184430 A1 | * | 12/2002 | Ukai et al. ........................ 711/3 |
| 2004/0024967 A1 | * | 2/2004 | Zhang ............................. 711/118 |
| 2004/0034759 A1 | | 2/2004 | Katzman et al. |
| 2006/0259748 A1 | * | 11/2006 | Lin et al. ........................ 712/226 |
| 2006/0277425 A1 | * | 12/2006 | Renno et al. .................. 713/323 |
| 2007/0005933 A1 | * | 1/2007 | Kopec et al. .................. 711/207 |
| 2008/0016327 A1 | | 1/2008 | Menon et al. |

FOREIGN PATENT DOCUMENTS

WO 0022508 4/2000

OTHER PUBLICATIONS

International Search Report—PCT/US09/032919, International Search Authority—European Patent Office—Jun. 23, 2009.
Written Opinion—PCT/US09/032919, International Search Authority—European Patent Office—Jun. 23, 2009.

* cited by examiner

*Primary Examiner* — Hal Schnee
(74) *Attorney, Agent, or Firm* — Peter M. Kamarchik; Nicholas J. Pauley; Jonathan T. Velasco

(57) ABSTRACT

In an embodiment, a method is disclosed that includes, comparing, during a write back stage at an execution unit, a write identifier associated with a result to be written to a register file from execution of a first instruction to a read identifier associated with a second instruction at an execution pipeline within an interleaved multi-threaded (IMT) processor having multiple execution units. When the write identifier matches the read identifier, the method further includes storing the result at a local memory of the execution unit for use by the execution unit in the subsequent read stage.

27 Claims, 12 Drawing Sheets

SYSTEM AND METHOD OF DATA FORWARDING WITHIN AN EXECUTION UNIT

I. FIELD

The present disclosure is generally related to a system and method of data forwarding within an execution unit.

II. DESCRIPTION OF RELATED ART

In conventional processors, execution of an instruction may require several stages. Within a program sequence, data-dependent instructions are typically separated to allow time for a first instruction to be processed through each of the stages and for a result to be written to a register before executing a second instruction that uses the result from the first instruction. In this instance, several data-independent instructions may be used to separate the data-dependent instructions within a sequence of instructions to allow time for a result to be produced and stored before it is needed in execution of a subsequent instruction. By using data-independent instructions to separate data-dependent instructions, pipeline stalls can be reduced by allowing the processor pipeline to operate at or near capacity.

Modern compilers attempt to reduce execution pipeline unit stalls by executing instructions out of sequence. In particular, data independent instructions and/or instructions that are ready to be executed are placed in front of instructions that are not yet ready (i.e., instructions that may be data dependent where the data is not yet determined from another executing instruction). Typically, a compiler application may be used to recognize such data dependent instructions and may organize instructions within a program sequence to reduce pipeline stalls by spacing data-dependent instructions from corresponding data-generating instructions within the program sequence.

III. SUMMARY

In a particular embodiment, a method is disclosed that includes, comparing, during a write back stage at an execution unit, a write identifier associated with a result to be written to a register file from execution of a first instruction to a read identifier associated with a second instruction at an execution pipeline within an interleaved multi-threaded (IMT) processor having multiple execution units. When the write identifier matches the read identifier, the method further includes storing the result at a local memory of the execution unit for use by the execution unit in the subsequent read stage.

In another particular embodiment, a method is disclosed that includes determining a second address associated with a second packet of instructions from a first address associated with a first packet of instructions. A carry bit of an adder of a data unit is examined to determine whether determining the second address crossed a boundary of a cache line associated with a multi-way cache. When the boundary is not crossed, the multi-way cache is accessed to retrieve data from the second address using tag array data and translation look-aside buffer (TLB) lookup data associated with the first address that was determined from a previous tag array lookup operation.

In still another particular embodiment, a multi-threaded processor is disclosed that includes an execution unit having a local memory to store one or more data values. The execution unit further includes a logic circuit adapted to determine whether a read address associated with a read operation matches a write back address associated with a previous write back operation. The logic circuit is adapted to store the one or more data values at the local memory when the read address matches the write back address.

In yet another particular embodiment, a processor is disclosed that includes means for comparing a write identifier associated with a result to be written to a register file from execution of a first packet of instructions to a read identifier associated with a second packet of instructions at an execution pipeline within an interleaved multi-threaded (IMT) processor having multiple execution units. The processor further includes means for selectively storing the result locally at an execution unit for use in executing the second packet of instructions when the write identifier matches the read identifier.

One particular advantage provided by embodiments of a processor with data forwarding logic and a local memory is provided in that a result from execution of a first instruction may be stored locally and used in executing a second instruction, without performing a register read file operation. By selectively skipping register read file operations, register file power consumption may be reduced.

Another particular advantage is provided in that tag array lookup operations may be selectively skipped when a second address of a second instruction is associated with a same cache line as a first address of a first instruction. In this example, the tag array lookup operation for the second address may be skipped and tag array information determined from a previous lookup operation associated with the first address may be reused. By selectively skipping tag array lookup operations, overall power consumption may be reduced.

Yet another particular advantage is provided in that the same logic circuitry may be used to selectively forward data and to selectively skip tag array lookup and TLB lookup operations. Additionally, an assembler or compiler may be used to arrange packets of instructions to create opportunities for forwarding data (i.e., intra-slot forwarding), for reusing tag array information (i.e., skipping a tag array lookup operation), and for selectively skipping TLB lookup operations. Such forwarding of data and selective skipping of tag lookup and/or TLB lookup operations can reduce an overall number of read operations, reducing overall power consumption.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
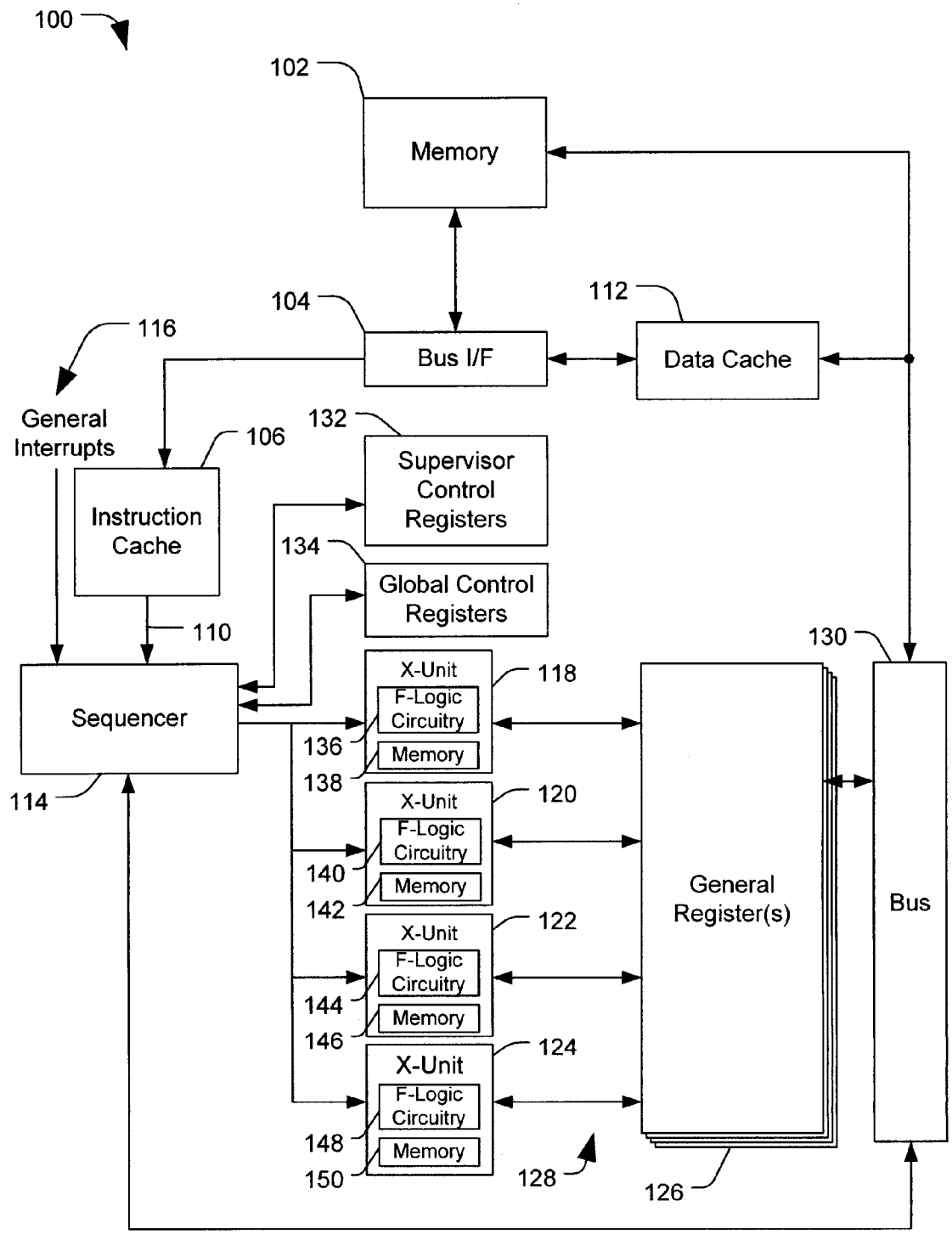
FIG. 1 is a block diagram of a particular illustrative embodiment of a system including an execution unit adapted to forward data.

FIG. 1 is a block diagram of a particular illustrative embodiment of a processing system 100 that includes at least one execution unit having forward logic circuitry and local memory. The processing system 100 includes a memory 102 that is adapted to communicate with an instruction cache 106 and a data cache 112 via a bus interface 104. The instruction cache 106 is coupled to a sequencer 114 by a bus 110. Additionally, the sequencer 114 is adapted to receive interrupts, such as general interrupts 116, which may be received from an interrupt register. The sequencer 114 is also coupled to supervisor control registers 132 and global control registers 134.

In a particular embodiment, the instruction cache 106 is coupled to the sequencer 114 via a plurality of current instruction registers, which may be coupled to the bus 110 and associated with particular threads of the processing system 100. In a particular embodiment, the processing system 100 is an interleaved multi-threaded processor including six threads.

The sequencer 114 is coupled to a first instruction execution unit 118, a second instruction execution unit 120, a third instruction execution unit 122, and a fourth instruction execution unit 124. Each instruction execution unit 118, 120, 122, and 124 can be coupled to a general register file 126 via a second bus 128. The general register file 126 can also be coupled to the sequencer 114, the data cache 112, and the memory 102 via a third bus 130. The supervisor control registers 132 and global control registers 134 may store bits that may be accessed by control logic within the sequencer 114 to determine whether to accept interrupts and to control execution of instructions.

The first execution unit 118 includes forwarding logic circuitry 136 and a local memory 138. The second execution unit 120 includes forwarding logic circuitry 140 and a local memory 142. The third execution unit 122 includes forwarding logic circuitry 144 and a local memory 146. The fourth execution unit 124 includes forwarding logic circuitry 148 and a local memory 150. While each of the execution units 118, 120, 122, and 124 is indicated to include forwarding logic (i.e., forwarding logic 136, 140, 144, and 148, respectively), it should be understood that, in particular embodiments, the forwarding logic, such as the forwarding logic 136, can be shared by other execution units, such as the execution units 120, 122 and 124. For example, in a particular embodiment, the execution unit 118 may include the forwarding logic 136 and the local memory 138, and the other execution units 120, 122, and 124 may include the local memories 142, 146, and 150 and may share the forwarding logic 136. In a particular embodiment, one or more of the execution units 118, 120, 122, and 124 may share local memory. For example, the execution units 118 and 120 may share the local memory 138, while the execution units 122 and 124 may share the local memory 146. In another particular example, the forwarding logic 136 may be external to the execution unit 118 and may communicate with the execution units 118, 120, 122, and 124, as shown with respect to a control unit 406 and execution units 408, 410, 412, and 414 illustrated in FIG. 4.

In a particular embodiment, the processing system 100 is adapted to receive a first packet of instructions that is executable by the execution units 118, 120, 122, and 124 and to receive a second packet of instructions that depends on a result from the first packet of instructions. The first packet of instructions can include four instructions, which may be provided to the execution units 118, 120, 122 and 124. The execution units 118, 120, 122, and 124 may process the instructions from the first packet of instructions via a plurality of stages including a decode stage, a register file access stage, multiple execution stages, and a write back stage. At the write back stage, the forwarding logic 136 of the execution unit 118 may determine that a read address of the second packet of instructions matches a write back address of the first packet of instructions and may write back the data to the general register file 126 and store the data locally at the memory 138. In an alternative embodiment, the execution unit 118 may decode at least a portion of the instructions of each received packet of instructions to determine a read address and a write back address for each instruction. The forwarding logic circuitry 136 may be adapted to compare a read address of a second packet to a write back address of a first packet of instructions and to send a data forwarding control signal to other execution units (such as the instruction execution units 120, 122, and 124) to store the data locally (i.e., at a respective local memory 142, 146, or 150). The data may be retrieved from the memory 138, 142, 146 or 150 for use in executing an instruction from a second (subsequent) packet of instructions.

In a particular example, the forwarding logic circuitry 136 can detect that an instruction of a second packet of instructions uses a result from a first packet of instructions. In particular, a first instruction writes data to the same location from which a second instruction reads data. In this example, the forwarding logic circuitry 136 is adapted to determine that the result of an instruction within the first packet of instructions is utilized by an instruction within the second packet of instructions. As illustrative, non-limiting examples, the forwarding logic circuitry 136 may receive a signal from control logic circuitry (not shown) having access to future instructions via the instruction cache 106 or the sequencer 114; or the forwarding logic circuitry 136 may detect a forwarding indicator such as a designated bit in the first packet that may be set by an assembler, a compiler, the sequencer 114, or other circuitry; or the forwarding logic circuitry 136 may predict use of the result of an instruction at least partially in response to the instruction type. In another embodiment, the forwarding logic circuitry 136 may be configurable to operate in a first mode to locally store all instruction results for use by subsequent instructions, or in a second mode to store no instruction results. The forwarding logic circuitry 136 causes the execution unit 118 to store the result of the execution in the local memory 138 in addition to writing the result to the general register file 126 via the bus 128. When the data dependent instruction from the second packet of instructions is provided to the execution unit 118, the forwarding logic circuitry 136 causes the execution unit 118 to skip a register read operation and to access the result stored in the local memory 138, and to utilize the result in executing the instruction from the second packet of instructions. Thus, the execution unit 118 utilizes the forwarding logic circuitry 136 to reduce a number of read operations to the general register file 126.

By compiling the packets of instructions such that data dependent instructions are ordered in adjacent packets within the program sequence, the compiled application may enhance power savings by taking advantage of the forwarding logic circuitry 136, 140, 144, and 148 of the execution units 118, 120, 122, and 124. Data generated by an earlier instruction may be stored at the local memory 138, 142, 146, or 150, such as at a buffer, latch, or flip-flop, local register, or other memory element, to be used by an adjacent packet without performing a register read for the adjacent packet. In an illustrative embodiment where data may be forwarded between packets that are not adjacent, the local memory 138, 142, 146, or 150 may include one or more registers for temporary local storage of the data while one or more intervening packets are processed. In particular, by ordering the data dependent instruction in adjacent packets of instructions, the compiler increases a potential for data forwarding, thereby increasing a number of skipped read operations and reducing overall power consumption.

In a particular example, the execution unit 118 includes forwarding logic circuitry 136 to forward operands (and/or data) from one packet of instructions to a next packet of instructions. Such data forwarding reduces an overall number of register read file operations and reduces overall register file power consumption. An example of a data-dependent pair of instruction packets is provided below in TABLE 1.

TABLE 1

Data Forwarding Example.

```
// first packet of instructions
{
R7:6 = VALIGNB(R9:8,R7:6,#2)
R15:14 += VDMPY(R13:12,R7:6):<<1:sat
R1 = R21
R3 = ADD(R0, #8)
}
// second packet of instructions
{
R15:14 = VASRW(R15:14,#3)// Scaling output
R17:16 += VDMPY(R13:12,R7:6):<<1:sat
R10 = MEMW(R1++#4)// load coefficients
}
```

In this example, the particular instructions that are executed are not relevant to this disclosure, except that a value stored at the register pair R7:6 that is produced by an execution unit in executing the VALIGNB instruction associated with the first packet of instructions is used by the execution unit in executing the VDMPY instruction associated with the second packet. In a particular example, an assembler or compiler may arrange the instructions such that both the VALIGNB and subsequent VDMPY are executed in the same execution slot, such as the execution unit 118. Additionally, the assembler or compiler may arrange the second instruction packet to immediately follow the first instruction packet within a program sequence.

Figure 2:
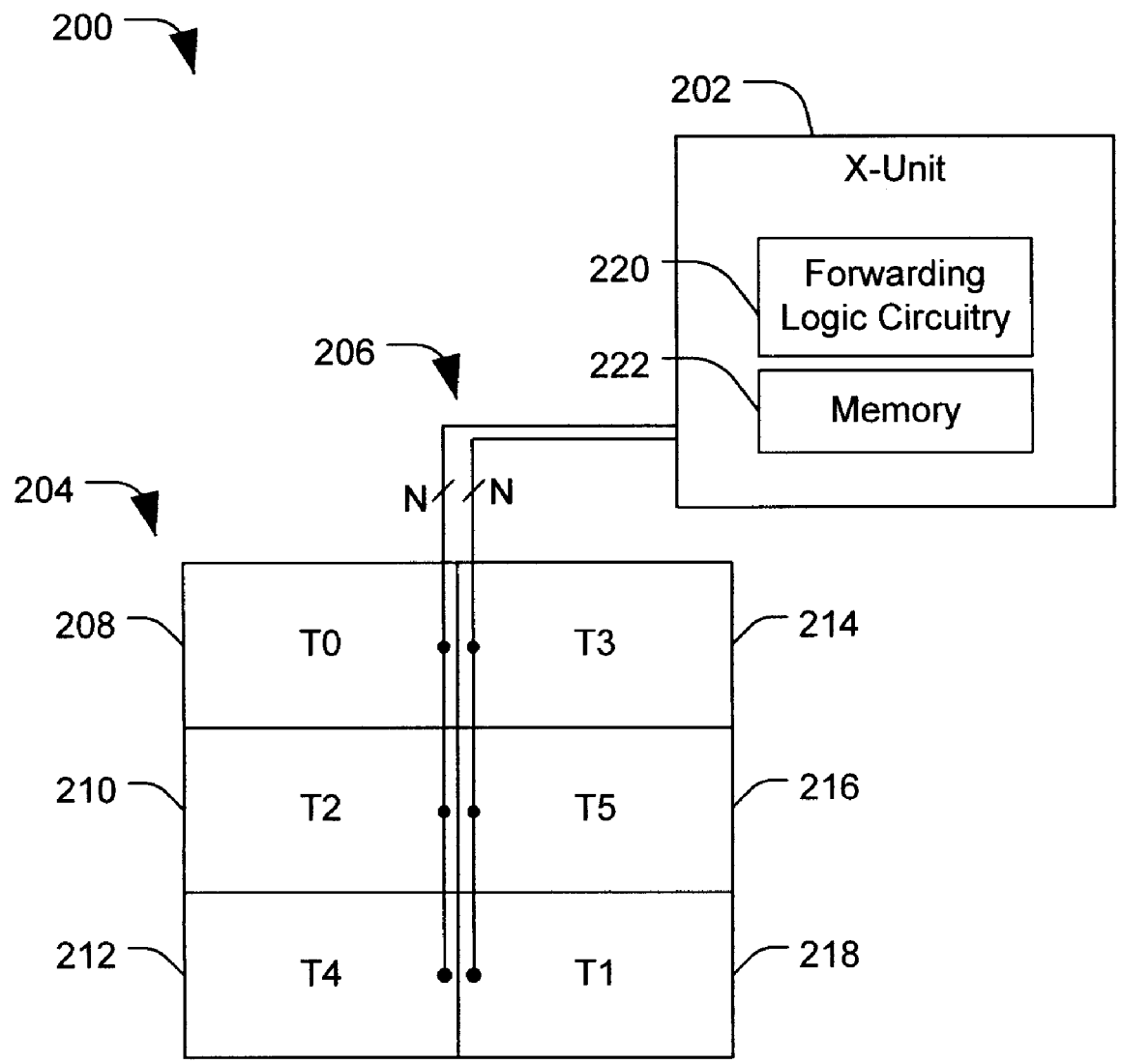
FIG. 2 is a block diagram of a particular illustrative embodiment of an execution unit adapted to forward data.

FIG. 2 is a block diagram of a portion of a system 200 including an execution unit 202 having forwarding logic circuitry 220 and a memory 222. The system 200 includes a memory device 204 that is external to the execution unit 202 and that has multiple memory locations 208, 210, 212, 214, 216, and 218. Each of the memory locations 208, 210, 212, 214, 216, and 218 may be associated with a memory address that is accessible to the execution unit 202 via a bus 206. In general, the memory locations 208, 210, 212, 214, 216, and 218 are separated from the execution unit 202 by different lengths of the bus trace. Additionally, each access by the execution unit 202 to particular memory locations within the memory 204 consumes power. In general, the execution unit 202 is adapted to receive an instruction, decode the instruction, access a register file of the memory 204 to retrieve data, execute the instruction using the retrieved data, and write data back to the memory 204.

The execution unit 202 includes forwarding logic circuitry 220 and a local memory 222. The forwarding logic circuitry 220 is adapted to detect instances where data that is generated by execution of a particular instruction is to be used in executing a next instruction in a program sequence. In this instance, the execution unit 202 is adapted to utilize the forwarding logic 220 to store the result from execution of the first instruction in the local memory 222. The execution unit 202 may skip a register file read operation or a memory read operation and utilize the data stored in the local memory 222 during execution of the next instruction, thereby avoiding the memory read operation and conserving power. In general, by reducing over all memory accesses, power consumption may be conserved by selectively avoiding memory read operations, which dissipate power.

Figure 3:
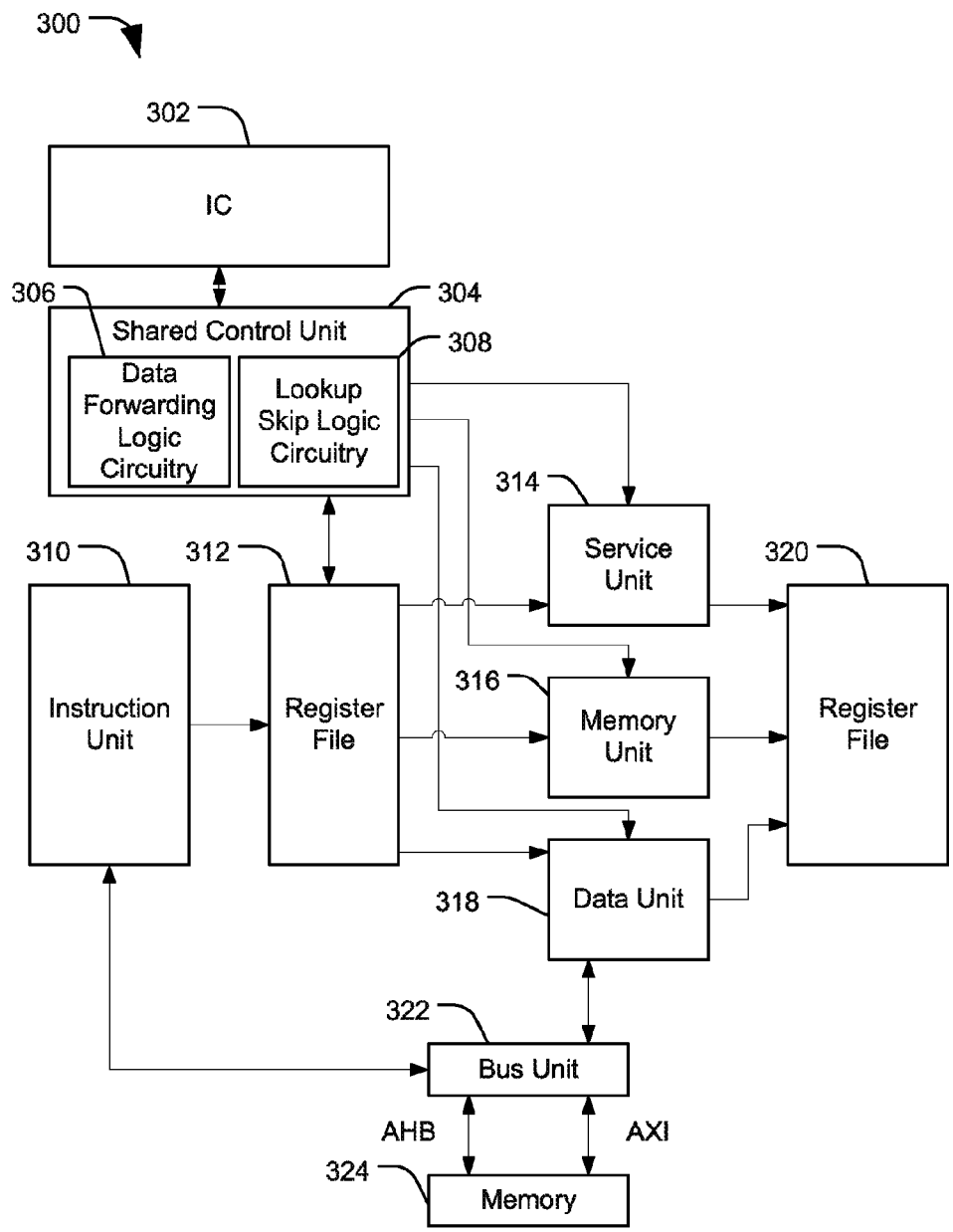
FIG. 3 is block diagram of a particular embodiment of a system including a shared control unit having data forwarding logic circuitry and tag array lookup/translation look-aside buffer (TLB) lookup skip logic circuitry.

FIG. 3 is block diagram of a system 300 including a shared control unit 304 having data forwarding logic circuitry 306 and lookup skip logic circuitry 308. The system 300 includes an instruction cache 302 that is coupled to the shared control unit 304. The shared control unit 304 is coupled to a service unit 314, a memory unit 316, and a data unit 318. The shared control unit 304 is also coupled to a source register file 312, which communicates with an instruction unit 310. The instruction unit 310 and the data unit 318 also communicate via a bus unit 322, which is coupled to a memory 324, such as a multi-way cache memory. The service unit 314, the memory unit 316, and the data unit 318 are coupled to a destination register file 320.

In a particular illustrative embodiment, the system 300 receives a packet of instructions, which may be executed by the data unit 318 to generate a result. The shared control unit 304 is adapted to utilize the data forwarding logic circuitry 306 to determine whether the result is to be used by a subsequent packet of instructions. The shared control unit 304 is adapted to communicate with the service unit 314, the memory unit 316, and the data unit 318 to skip a subsequent register read file operation. Additionally, the shared control unit 304 is adapted to communicate with the data unit 314 to instruct the data unit 314 to store the result in local memory, such as the memory 222 illustrated in FIG. 2 or the local memory 138, 142, 146, and 150 illustrated in FIG. 1. The shared control unit 304 is also adapted to control the service unit 314, the memory unit 316, and the data unit 318 to utilize the locally stored data in execution of the subsequent instruction packet. In a particular embodiment, the service unit 314, the memory unit 316, and the data unit 318 in combination perform processing operations analogous to operations performed by the execution units 118, 120, 122, and 124 depicted in FIG. 1.

In another particular embodiment, the shared control unit 304 is adapted to utilize the lookup skip logic circuitry 308 to determine whether to skip a tag array lookup operation, such as when a first memory address associated with a first instruction is within a same cache line within a memory as a second memory address associated with a second instruction. In a particular example, the system 300 may be operating in an "auto-increment address" mode, where the data unit 318 can determine a first memory address and can calculate a second memory address based on the first memory address. For example, the data unit 318 may determine a first memory address (A) and calculate a second memory address (A+8). In this particular example, the data unit 318 receives at least one instruction associated with a first packet of instructions. The data unit 318 is adapted to determine a memory address associated with the instruction and to calculate a second memory address.

In a particular example, the memory address may be a virtual memory address that is related to a physical memory address within an n-way cache memory. In this example, the data unit 318 can perform a virtual to physical address translation by performing a translation look-aside buffer (TLB) lookup operation to determine a physical memory address. The data unit 318 can perform a tag array lookup operation to identify tag data that identifies a way within a data array that is related to the physical memory address. The data unit 318 can use the tag data and the physical memory address information to retrieve data from the n-way cache memory. The tag data (including a way associated with the multi-way cache) may be stored at the local memory with the second memory address. When the second memory address is retrieved for use by the data unit 318, the data unit 318 can determine whether the second memory address and the first memory address are within a same cache line. When the first and second memory addresses are associated with the same cache line within the n-way cache memory, the lookup skip logic circuitry 308 is adapted to instruct the data unit 318 to skip a subsequent tag array lookup operation and to use the way from the first memory address to access the data at the n-way cache memory that is associated with the second memory address. If the first and second memory addresses are associated with different cache lines within the n-way cache memory, the lookup skip logic circuitry 308 is adapted to instruct the data unit 318 to perform a tag array lookup operation without performing a translation look-aside buffer (TLB) lookup operation. If the data unit 318 determines that the second memory address crosses a page boundary (i.e., exceeds a page size), the lookup skip logic circuitry 308 instructs the data unit 318 to perform a TLB lookup operation and a tag array lookup operation to determine a physical address and tag data associated with the second memory address.

In a particular example, a page of the n-way cache memory has a size that is greater than a cache line. For example, a cache line may include 32 bytes and a page may be approximately 4096 bits (approximately 4 kb). In this instance, if the auto-increment address increments by 8 bytes, the tag array data may be reused three times before an auto-incremented address calculation advances to a next cache line (assuming that the cache lines are being accessed in sequential operations), and the page translation from a first TLB lookup operation may be reused many times (i.e., approximately 511 times) before another TLB lookup operation needs to be performed, for example.

In particular, if a memory address accessed by a subsequent instruction is associated with the same cache line as a previous memory access, tag array data obtained in a previous tag array lookup operation may be reused for the subsequent memory addresses, thus avoiding a subsequent tag array lookup operation. In another particular example, by selectively performing TLB lookup operations only when the page boundary is crossed, overall power consumption may be reduced by reducing a number times that the TLB is accessed.

Figure 4:
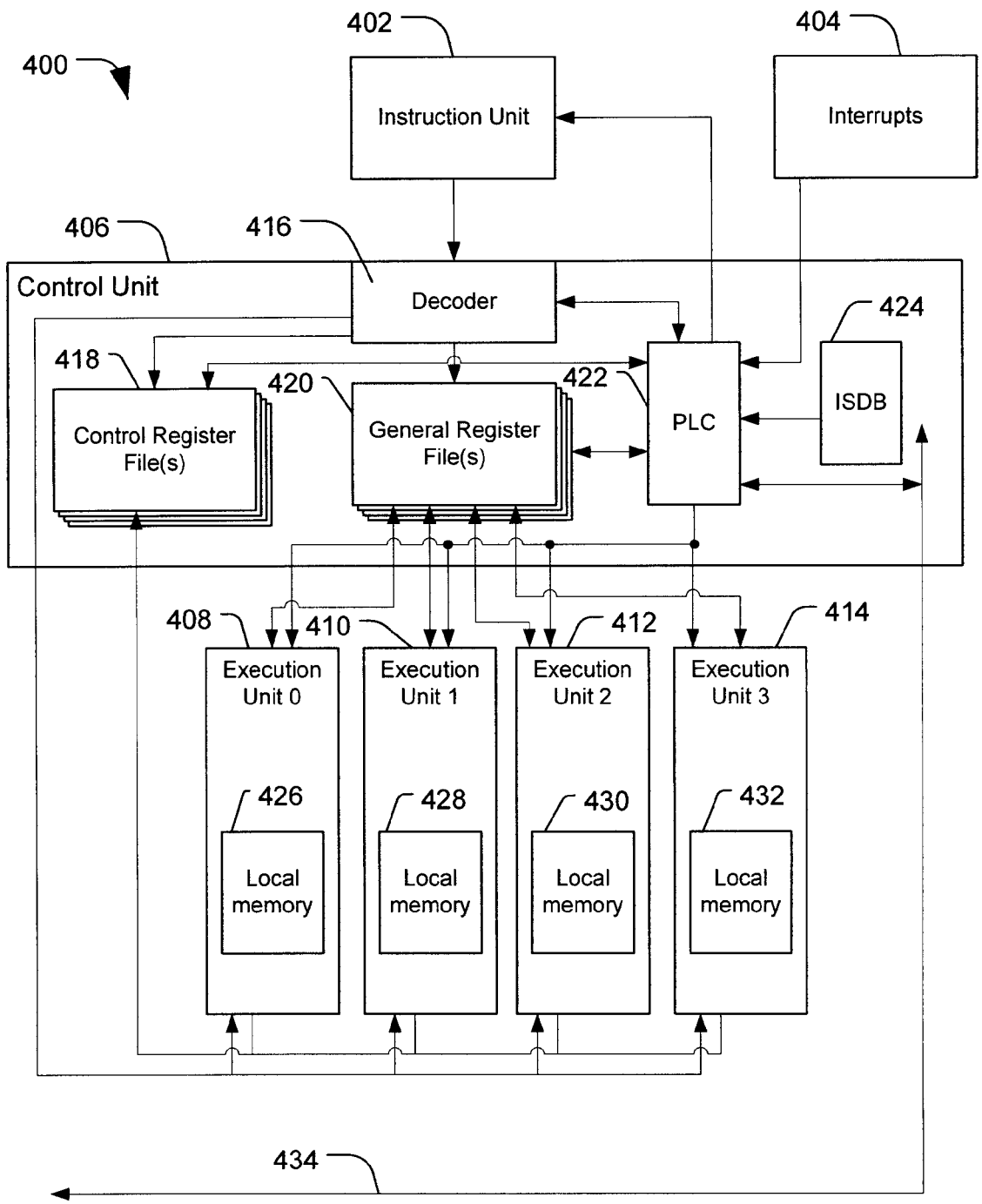
FIG. 4 is a block diagram of a particular embodiment of a processor including a programmable logic circuit (PLC) adapted to selectively forward data and to selectively skip tag array lookup and translation look-aside buffer (TLB) operations.

FIG. 4 is a block diagram of a processor system 400. The processor system 400 includes an instruction unit 402 and interrupt registers 404, which are coupled to a control unit 406. The control unit 406 is coupled to a plurality of execution units 408, 410, 412, and 414. Each of the execution units 408, 410, 412, and 414 may include a local memory 426, 428, 430, and 432, respectively.

The control unit 406 includes a decoder 416, control register files 418, general register files 420, a programmable logic controller (PLC) circuit 422 and an in-silicon debugger (ISDB) circuit 424. The ISDB circuit 424 provides a joint test action group (JTAG) based hardware debugger that can be used to debug software while the processor system 400 is running. In a particular embodiment, the ISDB circuit 424 supports individual debugging of threads, allowing suspension of thread execution and allowing observation and alteration of instruction and data memory, including the control register files 418 and the general register files 420.

In a particular illustrative embodiment, the decoder 416 receives and decodes instructions. The decoder 416 communicates data related to the decoded instructions to the PLC circuit 422, which may include logic to detect when a first instruction packet generates a result that will be utilized by a second instruction packet in a sequence of instruction packets. Upon detection of such data dependency between sequential instruction packets, the PLC circuit 422 is adapted to generate a control signal to at least one of the execution units 408, 410, 412, and 414 that is executing the data-generating instruction to store a result at the respective local memory 426, 428, 430, or 432. The PLC 422 is adapted to control the general register files 420 and the decoder 416 to route the data-dependent instruction from the subsequent instruction packet to the selected execution unit (e.g., execution unit 408) so that the execution unit may utilize the locally stored data (i.e., data stored at the local memory 426) in the execution of the subsequent instruction. In this example, the PLC 422 may also control the execution unit 408 and the bus 434 to prevent the execution unit 408 from accessing a memory (such as the general register files 420) to retrieve the result when the result is locally stored.

In a particular example, the execution unit 408 may receive a data generating instruction from the control unit 406, execute the instruction, and write back the result to the general register files 420. The execution unit 408 may also store the result in the local memory 426 responsive to a control signal received from the PLC 422 of the control unit 406. The execution unit 408 may receive a next instruction from the control unit 406 that utilizes the stored result from the local memory 426. The execution unit 408 may access the local memory 426 to retrieve the stored result and execute the next instruction using the retrieved result. In this particular example, the execution unit 408 can execute the next instruction without reading the result back from the general register file 420, thereby skipping a register read file operation and conserving power.

In another particular embodiment, the control unit 406 is adapted to selectively reuse tag array data determined from a tag array lookup operation. For example, when a second address is calculated from a first address using an auto-increment feature, the PLC 422 may examine a carry bit to determine when the second address is associated with a different cache line from the first address. For example, if a cache line is 32 bytes wide, the fifth bit of the second address represents a carry bit. When the carry bit changes, the second address is associated with a next cache line within the cache memory. In general, the PLC 422 instructs the execution units 408, 410, 412, and 414 to reuse the tag array data from a previous tag array lookup operation until the carry bit indicates that the second address is associated with a different cache line from the first instruction. In this instance, the PLC 422 causes the execution units 408, 410, 412, and 414 to perform a new tag array lookup operation without performing a translation look-aside buffer (TLB) lookup operation.

In still another particular embodiment, the control unit 406 is adapted to selectively perform a translation look-aside buffer (TLB) lookup operation. In particular, the PLC 422 may examine a carry bit from a calculation of the second memory address to determine when the calculated memory address indicates that a page boundary has been crossed. For example, if a page size of the memory array is approximately 4096 bits (i.e. 4 kb), an eleventh bit of the second memory address may represent a carry bit. Accordingly, when the eleventh bit of the second memory address changes, a page boundary is crossed and the PLC 422 causes one of the execution units 408, 410, 412, or 414 to initiate a TLB lookup operation, which may be followed by a tag array lookup operation. In this example, the tag array lookup operations occur more frequently than the TLB lookup operations. The PLC 422 is adapted to selectively skip one or both of the tag array lookup operation and the TLB lookup operation, reducing overall power consumption.

Figure 5:
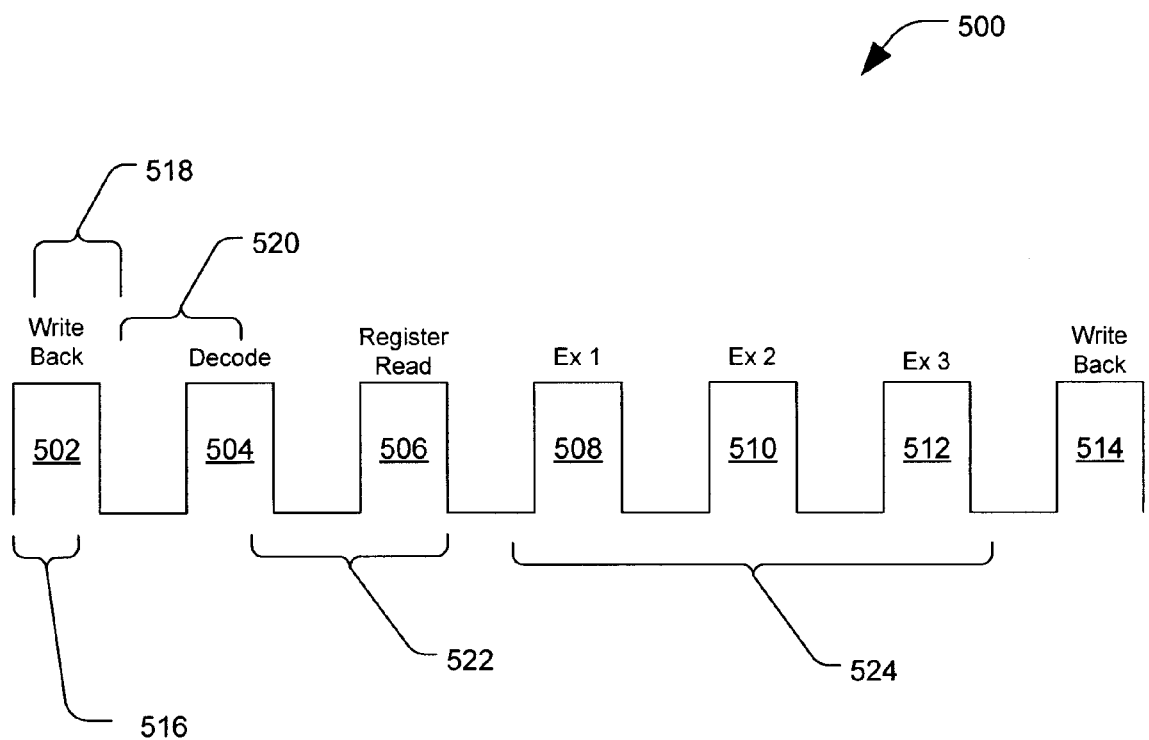
FIG. 5 is a timing diagram of an illustrative embodiment of processes within an execution pipeline adapted to forward data.

FIG. 5 is a diagram of a particular example of an instruction cycle 500 of an execution unit that includes data forwarding logic. In general, the instruction cycle 500 represents multiple stages of an execution unit from the perspective of a particular thread. The execution unit generally processes data and instructions during one or more stages including a write back stage 502, a decode stage 504, a register read stage 506, one or more execution stages 508, 510, and 512, and a second write back stage 514. It should be understood that the instruction cycle 500 includes only one write back stage (the write back stage 514) and then the execution cycle repeats, starting at the decode stage 504. The write back stage 502 is illustrated for discussion purposes.

Generally, at the write back stage 502, a result from a previously executed instruction is written back to a register, such as a general register file, at 516. A next packet of instructions (which may include one to four instructions) is received and a read identifier of the received packet is compared to a write identifier associated with the write result that was written to the register, at 518. When the read identifier and write identifier match, the write result is stored locally at the execution unit (at 520) as well as being written back at the register, at 516. In this instance, the register read (at 506) may be skipped and the data stored locally at the execution unit may be used, at 522. At 524, an instruction is executed using at least one of the data read during a register read stage (506) or the data stored locally at the execution unit. Thus, the when read identifier and write identifier match (at 518), the register read stage (at 506) may be skipped and locally stored data may be utilized, thus allowing for data forwarding.

In a particular illustrative embodiment, the execution unit stages 504, 506, 508, 510, 512 and 514, illustrated in FIG. 5, represent cycles of an execution unit within an interleaved multithreaded processor. Additionally, the write back stage 502 represents a last stage of the execution cycle of a previous instruction. Without performing a register read file operation at the read file stage 506, data from the previous instruction may be retrieved from a local memory at the execution unit (at 522) and can be processed with the next instruction, at 524 (i.e., during the one or more execution stages 508, 510 and 512). In a particular illustrative embodiment, each of the stages 504, 516, 508, 510, 512, and 514 may represent clock cycles at which particular operations are performed.

Figure 6:
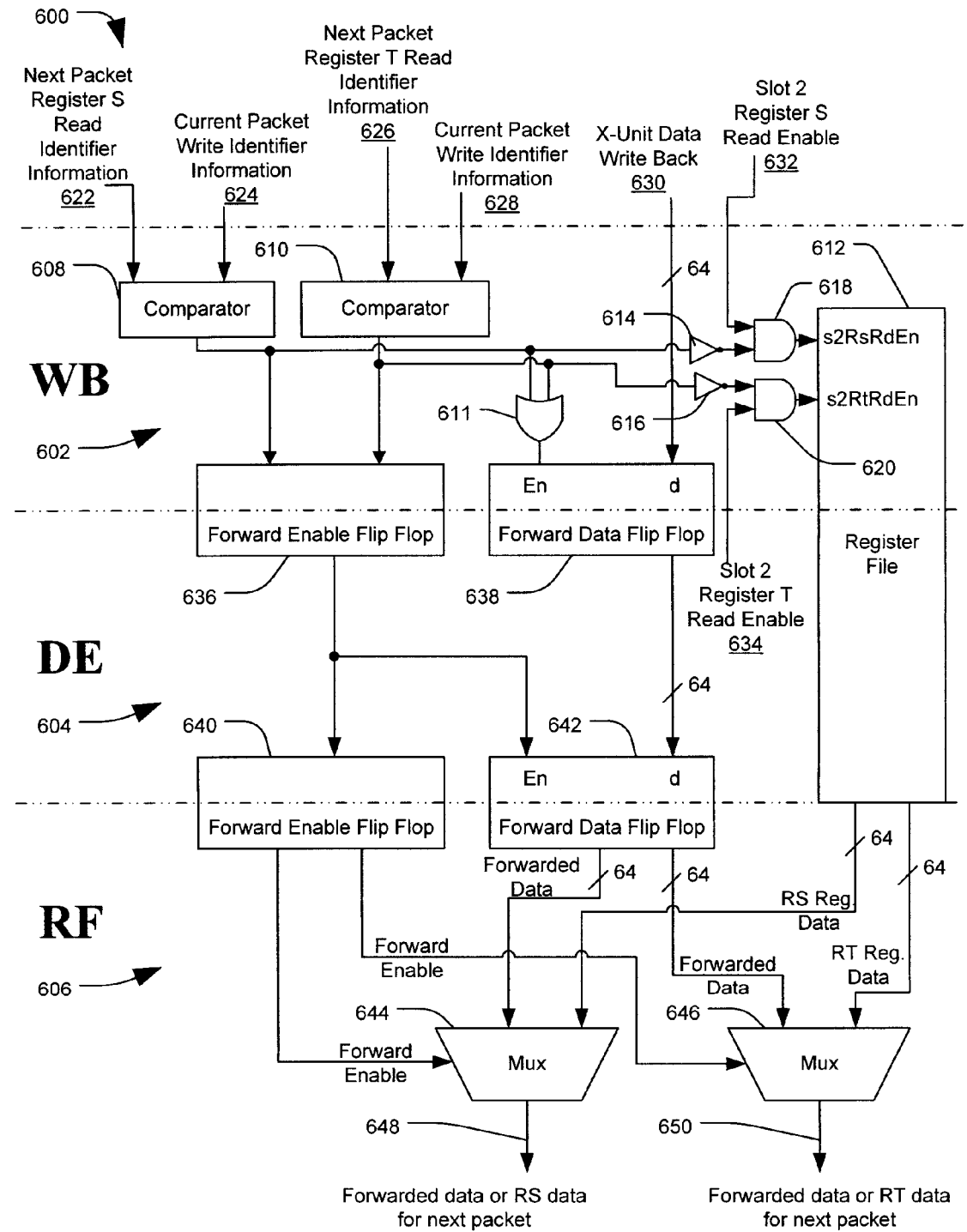
FIG. 6 is a diagram of a particular illustrative example of a forwarding logic circuit within an execution pipeline.

FIG. 6 is a block diagram of a particular illustrative embodiment of data forwarding logic 600 within an execution unit of a processor. In this instance, the data forwarding logic 600 is illustrated with respect to a write back stage 602, a decode stage 604, and a read register file stage 606. In an illustrative embodiment, the data forwarding logic 600 represents a single processing slot of multiple slots, such as a representative slot 2, that may process read and write operations using representative registers "S" and "T" of a register file.

With respect to the write back stage 602, the forwarding logic 600 includes comparators 608 and 610, a logical OR gate 611, inverters 614 and 616, logical AND gates 618 and 620, and a register file 612. The forwarding logic 600 also includes a forward enable flip-flop circuit 636 and a forward data flip-flop circuit 638. The comparator 608 receives a next packet register "S" (Rs) read identifier information 622 and a current packet write identifier information 624 as inputs and provides an output that is coupled to an input of the inverter 614. An output of the inverter 614 is coupled to a first input of the logical AND gate 618 and a second input of the logical AND gate 618 is coupled to a slot 2 register "S" read enable (s2RsRdEn) input 632. The logical AND gate 618 also includes an output coupled to a slot 2 register of the register file 612. The comparator 610 receives next packet register "T" (Rt) read identifier information 626 (which may be the same as the next packet read identifier information 622) and a current packet write identifier information 628 and provides an output, which is coupled to an input of the logical AND gate 620 via the inverter 616. The logical AND gate 620 also receives a slot 2 register "T" read enable (s2RtRdEn) input 634 at a second input, and provides an output that is coupled to a slot 2 register of the register file 612. The outputs of the comparators 608 and 610 are also provided as inputs to the forward enable flip-flop 636 and as inputs to the logical OR gate 611, which provides an enable input to the forward data flip-flop 638. The forward data flip-flop 638 also receives data from an execution unit data write back 630.

At the decode stage 604 of the forwarding logic 600, an output of the forward enable flip-flop 636 is provided as an input to a second forward enable flip-flop 640 and as an enable input to a second forward data flip-flop 642. The forward data flip-flop 638 provides a data input to the second forward data flip-flop 642.

At the read register file stage 606, the second forward enable flip-flop 640 provides a forward enable signal to a selection input of a first multiplexer 644 and to a selection input of a second multiplexer 646. The first multiplexer 644 receives forwarded data at a first input and register (s) data at a second input and provides an output 648 that carries either forwarded data or register (s) data for use in executing a next packet of instructions. The second multiplexer 646 receives forwarded data at a first input and register (t) data at a second input and provides an output 650 that carries either forwarded data or register (t) data for use in executing a next packet of instructions.

In general, the comparator 608 is adapted to receive a next packet read identifier information 622 and a current packet write identifier information 624. The comparator 610 is adapted to receive a next packet read identifier information 626 and a current packet write identifier information 628. When one of the next packet read identifiers 622 and 626 matches one of the current packet write identifiers 624 and 628, the comparator that identifies the match (e.g., one of the comparators 608 and 610) provides a logical one (1) value at its output, enabling the forward data flip-flop 638 and turning off a corresponding register read enable via the respective inverter 614 or 616 and the respective logical AND gate 618 or 620.

In a particular illustrative embodiment, when a next packet read identifier 622 matches current packet write identifier information 624, the comparator 608 provides a logic high output as an input to the forward data flip-flop 638. The inverter 614 inverts the logic high output and provides a logic low value as an input to the logical AND gate 618, disabling the slot 2 register (s) read enable to the register file 612. The forward data flip-flop 638 receives data from the execution unit via a write back input 630 and stores the data. During the decode stage 604, the data is forwarded to a second forward data flip-flop 642. The forwarded data is provided to the first multiplexer 644 and the second multiplexer 646 and selectively provided to one of the first output 648 and the second output 650 based on an output from the second forward enable flip-flop 640. The second forward enable flip-flop 640 may provide the output of the comparator 608 to the first multiplexer 644 and provide the output of the comparator 610 to the second multiplexer 646 to select one of the forwarded data from the second forward data flip-flop 642 or register data.

The forwarding logic 600 is adapted to selectively enable register read operations based on a read/write identifier match. The forwarding logic 600 may also be used to selectively cache tag array data (such as way information) associated with a memory address for reuse in a subsequent instruction. In a particular example, the forwarding logic 600 or similar logic may be adapted to examine a carry bit associated with a calculated address to determine when a calculated address is associated with a next cache line (i.e., resulting in a tag array lookup operation and skipping a translation look-aside buffer (TLB) lookup operation). In another particular example, the forwarding logic or similar logic may be adapted to examine a carry bit associated with a calculated address to determine when a calculated address crosses a page boundary (i.e., resulting in a translation look-aside buffer (TLB) lookup operation and a tag array lookup operation). When the forwarding logic 600 or the similar logic determines that the tag array data is still valid (i.e., the cache line of a first and second memory address are the same), the tag array data may be latched at a data latch, such as the forward data flip flops 638 and 642 for use in accessing a second memory location, without performing a TLB lookup operation and/or a tag array lookup operation.

Figure 7:
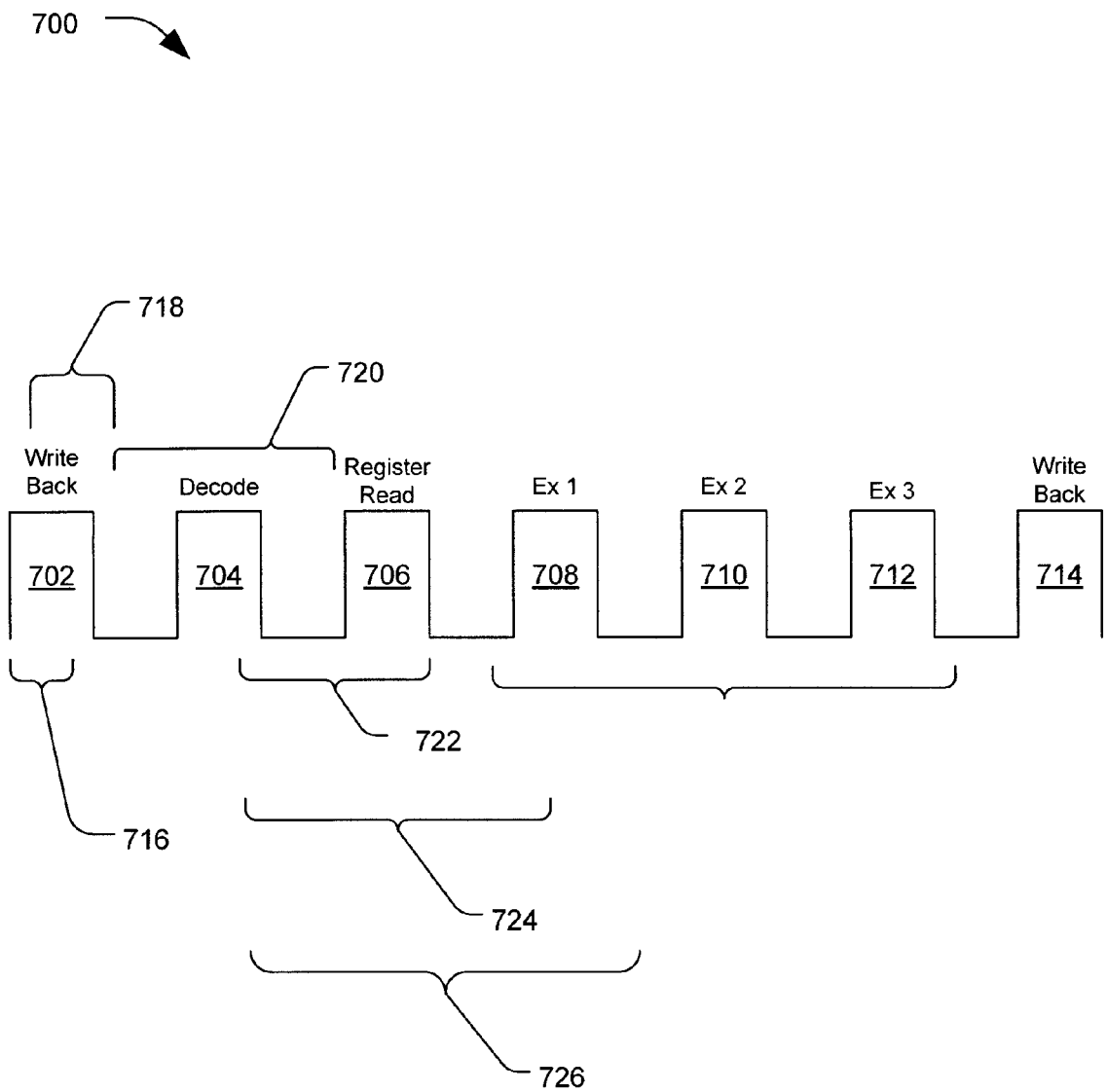
FIG. 7 is a timing diagram of an illustrative embodiment of processes within an execution pipeline adapted to skip a tag array lookup operation.

FIG. 7 is diagram of a particular example of an instruction cycle 700 of an execution unit that includes data forwarding logic and that is adapted to selectively skip a lookup operation. The instruction cycle 700 generally includes multiple stages, including a write back stage 702, a decode stage 704, a register read stage 706, one or more execution stages 708, 710, and 712, and a second write back stage 714. It should be understood that the instruction cycle 700 includes only one write back stage (the write back stage 714) and then the execution cycle repeats, starting at the decode stage 704. The write back stage 702 is illustrated for discussion purposes.

Generally, at an execution stage (such as the execution stage 708) of execution of a previous instruction, a first memory address and a second memory address may be calculated, and the second memory address may be stored at a local memory (such as the local memory 138 illustrated in FIG. 1). During the write back stage 702, a result from the previously executed instruction is written back to a cache address or register, such as the general register file, at 716. The second memory address may be retrieved from the local memory, at 718. A value of one or more carry bits associated with the second memory address are inspected to determine if the one or more carry bits indicate a carried value due to an auto-increment operation, at 720. If a value of a first carry bit of the one or more carry bits does not indicate that the second memory address is associated with a different cache line from the first memory address, a translation look-aside buffer (TLB) lookup operation and a tag array lookup operation are skipped and a previous tag array value is used to retrieve data from a memory, at 722. If a value of the first carry bit of the one or more carry bits indicates a carried value and a second carry bit of the one or more carry bits does not indicated a carried value, such as when the second memory address is associated with a different cache line within a same page as the previous memory address, a TLB lookup operation is skipped but a tag array lookup operation is performed to retrieve a tag array value for retrieving data from a memory, at 724. If each of the one or more carry bits indicates a carry value, a TLB lookup operation and a tag array lookup operation are performed, as indicated at 726.

In a particular example, a tag array lookup operation may be skipped and tag array data determined from a previous tag array lookup operation may be used to access an address within the memory. In particular, the tag array data may be used to access a memory address without looking up the tag array data and without performing a TLB lookup operation.

In a particular illustrative embodiment, the stages 704, 706, 708, 710, 712 and 714, illustrated in FIG. 7, may represent stages of an execution unit within an interleaved multi-threaded processor. Additionally, in a particular embodiment, the stages 704, 706, 708, 710, 712, and 714 may represent clock cycles.

Figure 8:
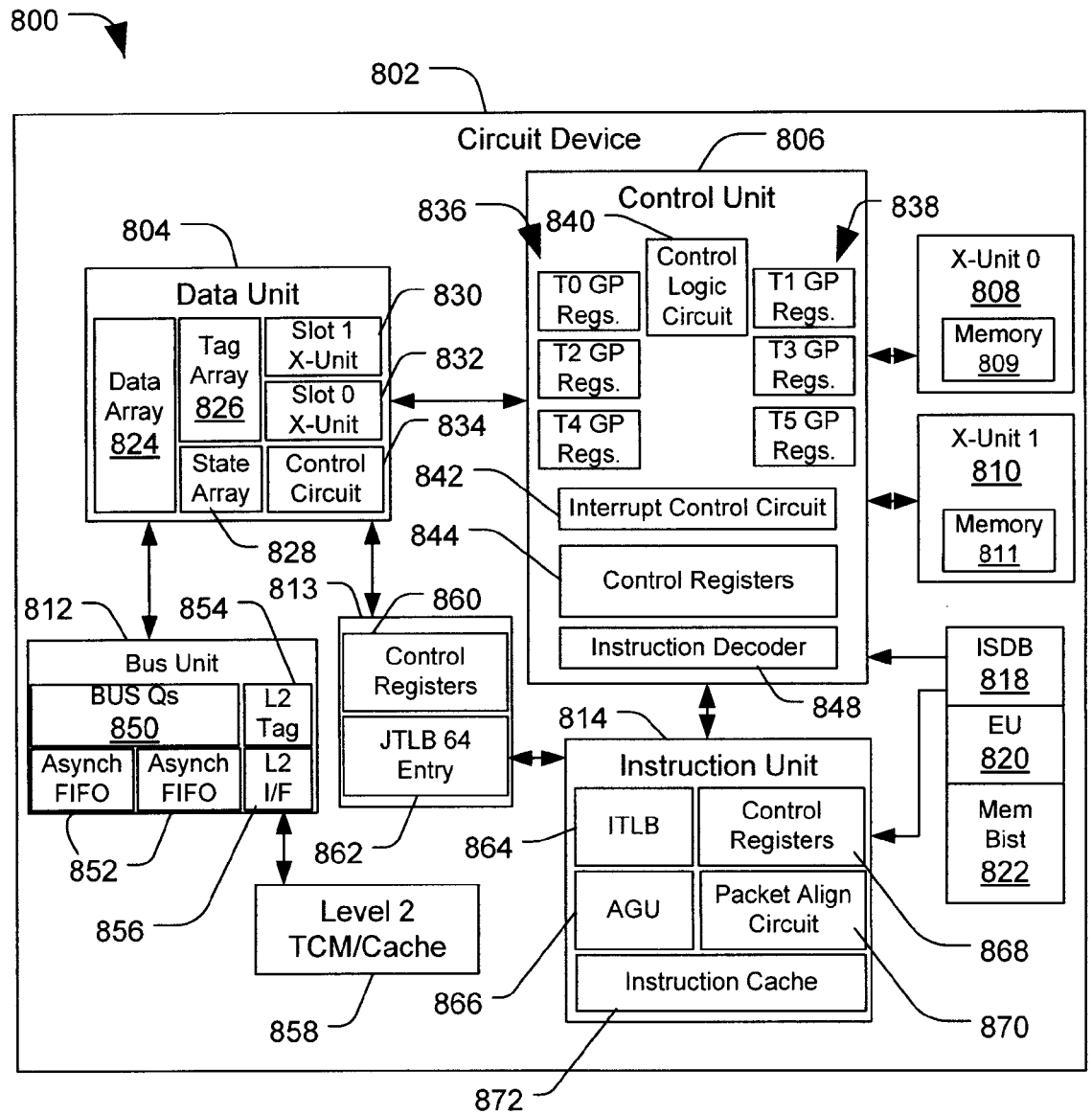
FIG. 8 is a block diagram of a particular illustrative embodiment of a system adapted to selectively forward data and to selectively skip a tag array lookup or a translation look-aside buffer (TLB) lookup operation.

FIG. 8 is a block diagram of a particular illustrative embodiment of a system 800 including a circuit device 802 having a control unit 806 to selectively forward data within the execution units 808 and 810 using local memory 809 and 811, respectively. The control unit 806 is also adapted to selectively skip a lookup operation related to a tag array 826 or to a translation look-aside buffer (TLB) unit 862. In a particular example, the control unit 806 may skip a lookup operation at the tag array 826, a lookup operation at the TLB unit 862, or any combination thereof, by forwarding tag array information and/or translation look-aside buffer (TLB) information from a previous lookup operation when a calculated address is within a same cache line or within a same page as a previously calculated address.

In general, the circuit device 802 includes a data unit 804, which communicates with the control unit 806, with a bus unit 812, and with a joint translation look-aside buffer (TLB) unit 813. The bus unit 812 communicates with a level 2 tightly coupled memory (TCM)/cache memory 858. The control unit 806 also communicates with a first execution unit 808, a second execution unit 810, an instruction unit 814, and an in-silicon debugger (ISDB) unit 818. The instruction unit 814 communicates with the joint TLB unit 813 and with the ISDB unit 818. The circuit device 802 also includes an embedded trace unit (EU) 820 and a memory built-in self-test (BIST) or design for testability (DFT) unit 822. The ISDB unit 818, the EU 820 and the memory BIST unit 822 provide a means for testing and debugging software operating at the circuit device 802.

The control unit 806 includes register files 836 and 838, a control logic circuit 840, an interrupt control circuit 842, control registers 844, and an instruction decoder 848. In general, the control unit 806 schedules threads and requests instructions from the Instruction Unit (IU) 814, and decodes and issues them to three execution units: the data unit 804

(execution slots 1 and 0, 830 and 832 respectively), the execution unit 808, and the execution unit 810. The instruction unit 814 includes an instruction translation look-aside buffer (ITLB) 864, an instruction address generation unit 866, instruction control registers 868, an instruction packet align circuit 870 and an instruction cache 872. The instruction unit (IU) 814 can be a front end of a processor pipeline that is responsible for fetching instructions from main memory or from the instruction cache 872 and for providing the fetched instructions to the control unit 806.

The data unit 804 includes a data array 824 that contains cacheable data. In a particular embodiment, the data array 824 may be a multi-way data array arranged in 16-sub-array memory banks with each bank including 16 sets of 16 ways. Each memory location within the sub-array may be adapted to store a double word or 8 bytes of data. In a particular example, the sub-array can contain 256 double words (i.e., 16×16 double words). The data unit 804 also includes the tag array 826 to store physical tags associated with the data array 824. In a particular embodiment, the tag array 826 is a static random access memory (SRAM). The data unit 804 also includes a state array 828 adapted to store a status associated with a cache line. In a particular example, the state array 828 supplies a cache way for replacement in response to a cache miss event. The data unit 804 also includes an execution unit (slot 1) 830 and an execution unit (slot 0) 832, which generally perform load and store operations. The data unit 804 includes a control circuit 834 to control the operation of the data unit 804.

In general, the data unit 804 communicates with the control unit 806 to receive instructions for execution at the execution units 830 and 832. The data unit 804 also communicates with the bus unit 812 for bus service requests and with the joint TLB unit 813 for joint TLB-main memory unit translations.

The bus unit 812 includes a bus queue unit 850, a level 2 tag array 854, asynchronous first-in first-out (FIFO) units 852, and a level 2 interface 856. The level 2 interface 856 communicates with the level 2 TCM/cache 858. The joint TLB unit 813 includes control registers 860 and a joint TLB table including 64 entries 862.

In a particular illustrative embodiment, the control unit 806 receives a first packet of instructions and a second packet of instructions. The control unit 806 may provide an instruction from the first packet of instructions to the execution unit 808 for execution. The execution unit 808 may execute a first instruction from the first packet of instructions and determine a first address associated with the first instruction. In a particular example, the execution unit 808 may calculate a first virtual address based on the first instruction and may calculate a second virtual address based on the first virtual address (i.e., via an auto-increment feature). The execution unit 808 may communicate with the data unit 804 via the control unit 808 to perform a translation look-aside buffer (TLB) lookup operation via the TLB unit 813. The data unit 804 may control the TLB lookup operation by communicating with the TLB unit 813 and may also perform a tag array lookup operation via the tag array 826 to determine a way within a multi-way memory, such as the data array 824. The TLB page translation information and the tag array data may be provided to the execution unit 808 via the control unit 806. The control unit 806 may instruct the execution unit 808 to store the tag array information and/or the TLB page translation information at the memory 809. The execution unit 808 may retrieve the data from the memory location based on the tag array information.

In a particular example, if the second virtual address is associated with the same cache line as the first virtual address, the execution unit 808 may use the stored tag array information from the memory 809 to directly access the physical memory, such as the data array 824, without performing a tag array lookup operation and without performing a TLB page translation. In a particular embodiment, the control logic circuit 840 at the control unit 806 may instruct the execution unit 808 to use the stored tag array information. If the second virtual address is associated with a different cache line as the first virtual address, the execution unit 808 may communicate with the data unit 804 via the control unit 806 to perform a tag array lookup operation to determine tag information related to the second virtual address without performing a TLB lookup operation (i.e., without performing a virtual to physical page translation).

In a particular illustrative embodiment, the execution units 808 and 810 include memory array lookup skip logic circuitry to determine when to skip a tag array lookup and/or a TLB lookup operation, such as the lookup skip logic circuitry 308 illustrated in FIG. 3. In another particular illustrative embodiment, the control logic circuit 840 may control the execution units 808 and 810 to selectively skip a tag array lookup, a TLB lookup, or any combination thereof. Additionally, the execution units 808 and 810 may include data forwarding logic circuits, such as the forward logic circuitry 136 illustrated in FIG. 1. In a particular illustrative embodiment, the control logic circuit 840 is adapted to selectively forward data from a first instruction to a second instruction by controlling the execution units 808 and 810 to store the data at the respective memory 809 and 811, for use in executing a subsequent instruction.

Figure 9:
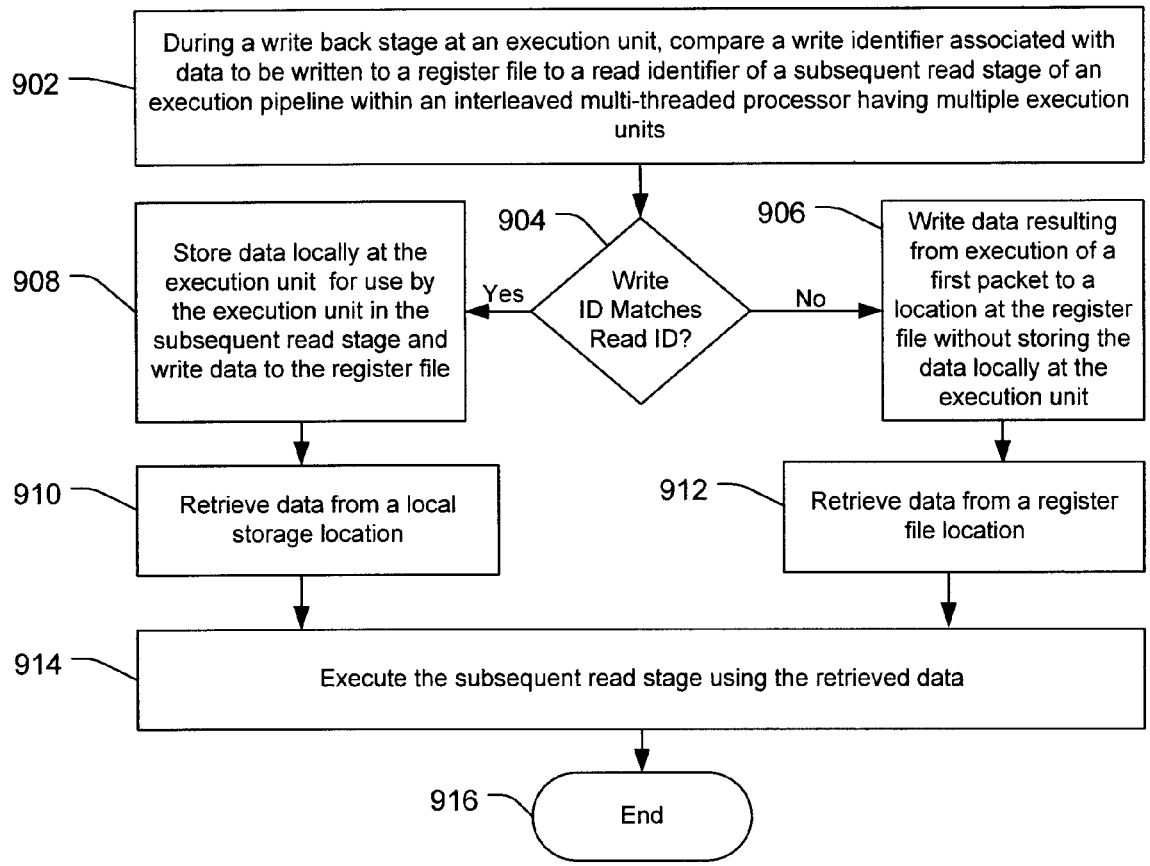
FIG. 9 is a flow diagram of a particular illustrative embodiment of a method of forwarding data within an execution unit.

FIG. 9 is a block diagram of a particular illustrative embodiment of a method of data forwarding. At 902, during a write back stage at an execution unit, a write identifier associated with data to be written to a register file is compared to a read identifier of a subsequent read stage of an execution pipeline within an interleaved multi-threaded processor having multiple execution units. Proceeding to 904, if the write identifier does not match the read identifier, the method advances to 906 and data resulting from execution of a first packet of instructions is written to a location at the register file without storing the data locally at the execution unit. Alternatively, if the write identifier does match the read identifier at 904, the method advances to 908 and data is written to the register file and stored locally at the execution unit for use by the execution unit in the subsequent read stage. Advancing from 908 to 910, the method includes retrieving data from a local storage location. Alternatively, advancing from 906 to 912, the method includes retrieving data from a register file location. Moving to 914, the method includes executing the subsequent read stage using the retrieved data. In a particular example, the method includes executing a packet of instructions at the execution unit using the data stored locally at the execution unit. The method terminates at 916.

In a particular example, the method may include identifying one or more zero-value bits included in the data to determine if a write identifier matches a read identifier. Based on the zero-value bits, the method may include generating an indicator to reduce power to data paths within the execution unit that are associated with the one or more zero-value bits. In another particular example, the method includes comparing a cache line address of a multi-way cache associated with a data unit to a cache line address associated with the write identifier and, when the cache line address associated with the write identifier matches the cache line address associated with the data unit, retrieving data from the multi-way cache without reading a translation look-aside buffer (TLB) tag.

Figure 10:
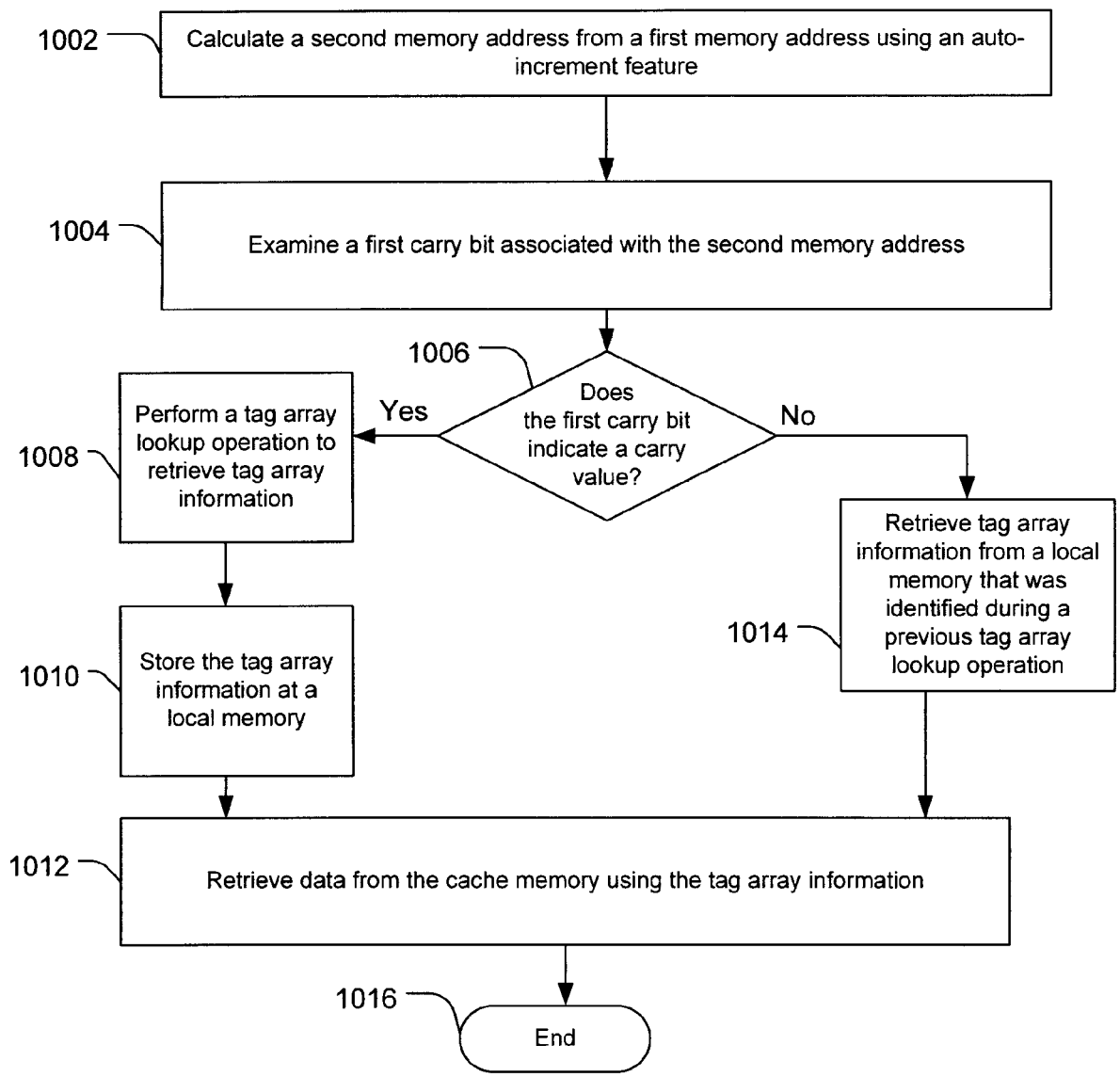
FIG. 10 is a flow diagram of a particular illustrative embodiment of a method of selectively skipping a tag array lookup operation.

FIG. 10 is a block diagram of a particular illustrative embodiment of a method of selectively skipping a tag array lookup operation. At 1002, a second memory address is calculated from a first memory address using an auto-increment feature. Continuing to 1004, a first carry bit associated with the second memory address is examined. In an illustrative embodiment, to determine whether the second address is within a same cacheline as the first address, the carry bit is an address bit that is associated with a size of the cacheline. For example, where consecutive addresses having low-order bits 0000, 0001, . . . 0111 are within a single cacheline, but the next consecutive address having low-order bits 1000 is in a different cacheline, then the bit that changes from 0 to 1 (i.e., the fourth least significant address bit) is the carry bit that is examined at 1004. Continuing the example, when the second address is generated by automatically incrementing the first address, if the fourth least significant address bit changes values, then a carry value is indicated. At 1006, if the first carry bit indicates a carry value, the method advances to 1008 and a tag array lookup operation is performed to retrieve tag array information associated with the second memory address. Proceeding to 1010, the tag array information is stored at a local memory. Moving to 1012, data is retrieved from the cache memory using the tag array information.

Returning to 1006, if the first carry bit does not indicate a carry value, the method advances to 1014 and the tag array information is retrieved from a local memory, where the tag array information was identified during a previous tag array lookup operation, such as a lookup operation associated with the first memory address. The method terminates at 1016.

Figure 11:
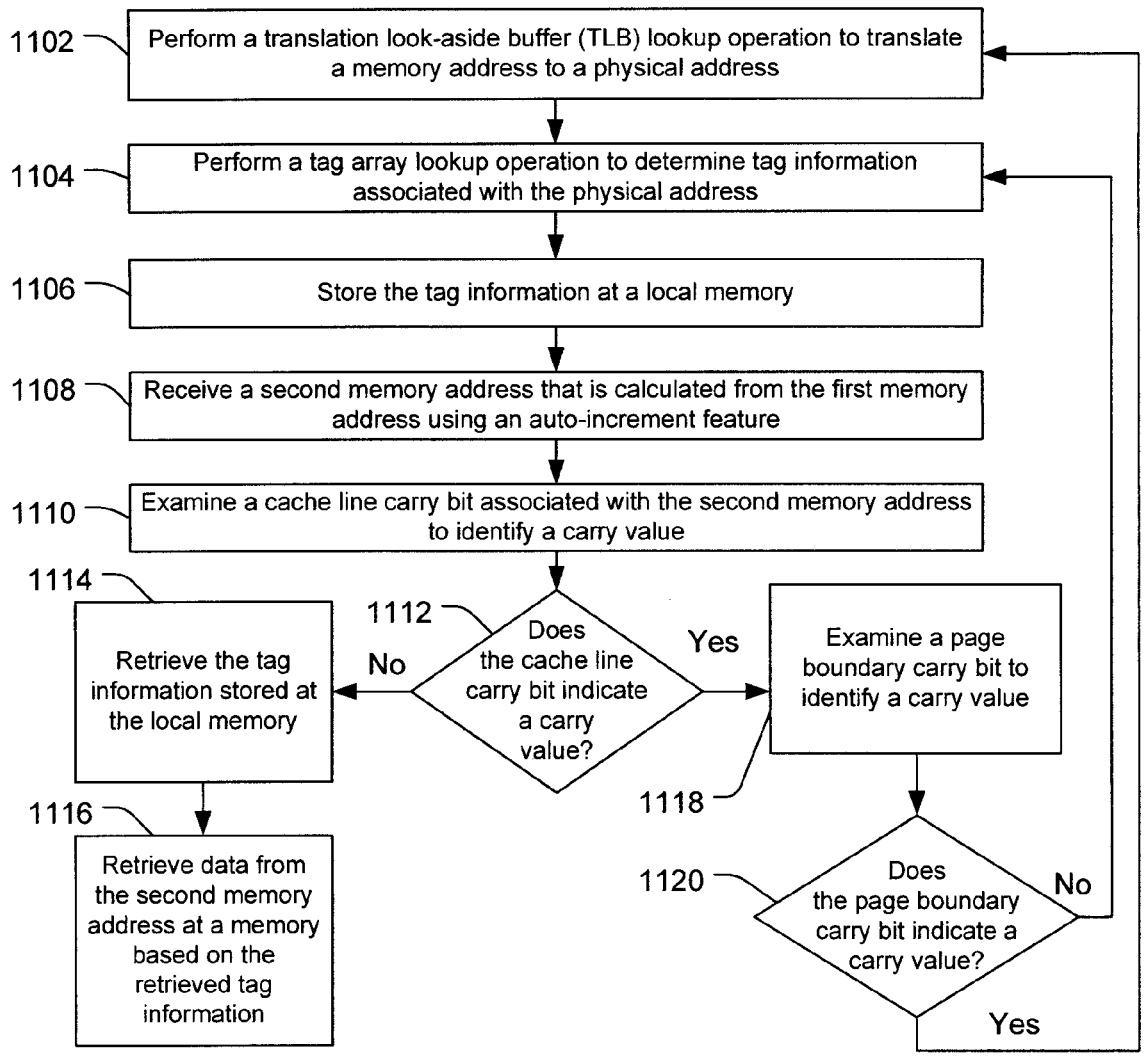
FIG. 11 is a flow diagram of a particular illustrative embodiment of a method of selectively skipping a tag array lookup operation and/or a translation look-aside buffer (TLB) lookup operation.

FIG. 11 is a flow diagram of a particular illustrative embodiment of a method of selectively skipping (bypassing) a tag array lookup operation, a translation look-aside buffer (TLB) lookup operation, or any combination thereof. At 1102, a TLB lookup operation is performed to translate a virtual memory address to a physical memory address. Continuing to 1104, a tag array lookup operation is performed to determine tag information associated with the physical address. Proceeding to 1106, the tag array information is stored at a local memory. Advancing to 1108, a second memory address is received that is calculated from the first memory address using an auto-increment feature. In a particular example, the second memory address may be calculated from the first memory address by incrementing the first memory address. Continuing to 1110, a cache line carry bit associated with the second memory address is examined to identify a carry value (i.e., a value of a carry bit). In a particular example, the carry bit may be fifth address bit related to a 32-bit cache, for example. If the cache line carry bit does not indicate a carry value, at 1112, the method advances to 1114 and the tag information stored at the local memory is retrieved. Continuing to 1116, data is retrieved from the second memory address at a memory based on the retrieved tag information. Returning to 1112, if the cache line carry bit indicates a carry value, the method advances to 1118 and a page boundary carry bit is examined to identify a carry value. At 1120, if the page boundary carry bit indicates a carry value, the method returns to 1102 and a TLB lookup operation is performed to translate a memory address to a physical address. Returning to 1120, if the page boundary bit does not indicate a carry value, the method advances to 1104 and a tag array lookup operation is performed to determine tag information associated with the physical address, without performing a TLB lookup operation.

Figure 12:
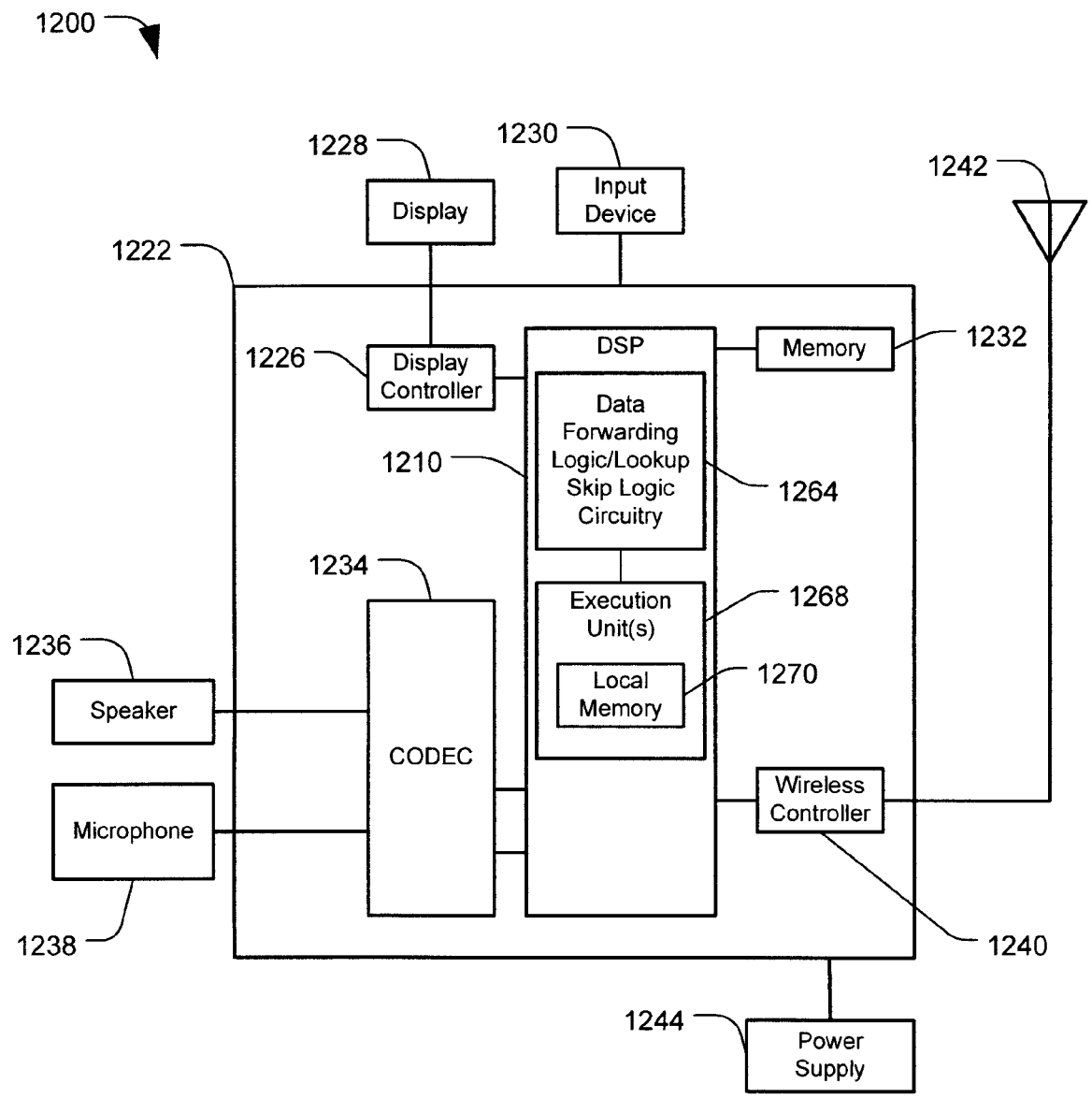
FIG. 12 is a block diagram of a particular illustrative embodiment of a communications device that includes an execution unit having forwarding logic circuitry and lookup skip logic circuitry.

FIG. 12 is a block diagram of a representative wireless communications device 1200 including a processor including logic circuitry to selectively skip register read operations and/or translation look-aside buffer (TLB) lookup operations. The wireless communications device 1200 can include a digital signal processor (DSP) 1210 that includes data forwarding/lookup skip logic circuitry 1264 that communicates with one or more execution units 1268. Each of the one or more execution units 1268 includes a local memory 1270. The data forwarding/lookup skip logic circuitry 1264 is operable to control the execution unit 1268 to forward data by storing data locally in the local memory 1270 for use by a subsequent packet of instructions. The wireless communications device 1200 also includes a memory 1232 that is accessible to the DSP 1210. The data forwarding/lookup skip logic circuitry 1264 is also adapted to control the execution unit 1268 to utilize previously determined tag array information (from a previous tag array lookup operation associated with a different memory address) to skip both a translation look-aside buffer (TLB) lookup operation and a tag array lookup operation. The previously determined tag array information may be used to access a memory, such as the memory 1232, without performing another tag array lookup operation. In another particular embodiment, page translation information for a first address determined from a previous TLB lookup operation may be used to perform a tag array lookup operation without performing another TLB lookup operation, as described with respect to FIGS. 1-11. In a particular embodiment, the data forwarding and/or TLB lookup skip logic circuitry 1264 can provide data forwarding functionality, tag array lookup skip functionality, TLB lookup skip functionality, or any combination thereof.

In a particular embodiment, the wireless communications device 1200 may include both the data forwarding circuitry and the lookup skip logic circuitry. In another particular embodiment, the wireless communication device 1200 may include only the data forwarding circuitry. In still another particular embodiment, the lookup skip logic circuitry may be included. In yet another particular embodiment, the logic circuitry that is adapted to determine whether to forward data may also be used to determine whether to skip a tag array lookup operation, a TLB lookup operation, or any combination thereof.

FIG. 12 also shows a display controller 1226 that is coupled to the digital signal processor 1210 and to a display 1228. A coder/decoder (CODEC) 1234 can also be coupled to the digital signal processor 1210. A speaker 1236 and a microphone 1238 can be coupled to the CODEC 1234.

FIG. 12 also indicates that a wireless controller 1240 can be coupled to the digital signal processor 1210 and to a wireless antenna 1242. In a particular embodiment, an input device 1230 and a power supply 1244 are coupled to the on-chip system 1222. Moreover, in a particular embodiment, as illustrated in FIG. 12, the display 1228, the input device 1230, the speaker 1236, the microphone 1238, the wireless antenna 1242, and the power supply 1244 are external to the on-chip system 1222. However, each is coupled to a component of the on-chip system 1222.

It should be understood that while the data forwarding and/or TLB lookup skip logic circuitry 1264, the one or more execution units 1268 and the local memory 1270 are depicted as separate components of the digital signal processor 1210, the data forwarding and/or TLB lookup skip logic circuitry 1264, the one or more execution units 1268 and the local memory 1270 may be integrated into other processing components, such as the wireless controller 1240, the CODEC 1234, the display controller 1226, other processing components (such as a general purpose processor (not shown), or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
during a write back stage at an execution unit of a plurality of execution units, comparing a write identifier associated with a result from an execution of a first instruction to a read identifier associated with a second instruction at an execution pipeline within an interleaved multi-threaded (IMT) processor that includes the plurality of execution units;
storing the result at a register file; and
storing the result at a local memory of the execution unit in response to determining that the write identifier matches the read identifier, wherein the result stored at the register file is provided from the register file to the execution unit without passing through the local memory.

2. The method of claim 1, further comprising storing the result at the register file without storing the result at the local memory in response to determining that the write identifier does not match the read identifier.

3. The method of claim 1, further comprising executing a packet of instructions at the execution unit using the result stored at the local memory.

4. The method of claim 1, further comprising:
identifying one or more zero-value bits included in the write identifier; and
generating an indicator to reduce power to data paths within the execution unit, wherein the data paths are associated with the one or more zero-value bits.

5. The method of claim 1, further comprising:
generating a data forward enable output indicator when the write identifier matches the read identifier; and
selectively disabling a slot of a register file in response to the data forwarding enable output indicator.

6. The method of claim 5, further comprising:
generating a selection signal related to the data forward enable output indicator; and
selectively providing one of an output from the register file or the result from the local memory to the execution unit for use in executing the second instruction.

7. The method of claim 1, further comprising:
examining a carry bit of a second memory address of the second instruction calculated from a first memory address of the first instruction to determine whether the second memory address and the first memory address are associated with a cache line; and
when a second cache line address associated with the second memory address matches a first cache line address associated with the first memory address, retrieving data from a multi-way cache without performing a tag array lookup operation.

8. A method comprising:
determining a second address associated with a second packet of instructions from a first address associated with a first packet of instructions;
examining a carry bit of an adder of a data unit to determine whether the second address crossed a boundary of a cache line associated with a multi-way cache;
in response to determining the second address crossed the boundary of the cache line associated with the multi-way cache, examining a second carry bit of the adder of the data unit to determine whether the second address crossed a boundary of a page associated with the multi-way cache; and
in response to determining the boundary of the cache line is not crossed, accessing the multi-way cache to retrieve data from the second address using tag array data and translation look-aside buffer (TLB) lookup data associated with the first address that was determined from a previous tag array lookup operation.

9. The method of claim 8, wherein, when a cache line boundary is crossed, the method further comprises performing a tag array lookup operation to determine tag array information associated with the second instruction without performing a translation look-aside buffer (TLB) lookup operation.

10. The method of claim 9, further comprising reading data from the multi-way cache using the tag array information.

11. The method of claim 8, wherein the first address comprises a first memory read address and the second address comprises a second memory read address.

12. The method of claim 8, further comprising:
comparing the second address to a first write address associated with a result determined from executing the first packet of instructions; and
when the first write address matches the second address, storing the result at a local memory within an execution unit for use in executing the second packet of instructions.

13. The method of claim 12, further comprising:
retrieving the result from the local memory; and
executing the second packet of instructions using the retrieved result.

14. The method of claim 8, wherein, when a page boundary is crossed, the method further comprises:
   performing a translation look-aside buffer (TLB) lookup operation to convert the second address to a physical address associated with the multi-way cache;
   performing a tag array lookup operation to determine tag information; and
   accessing a memory based on the tag information and the physical address.

15. The method of claim 8, wherein the second address is determined from the first address using relative addressing.

16. A multi-threaded processor comprising:
   an execution unit comprising:
      a local memory to store one or more data values; and
      a logic circuit adapted to determine whether a read address associated with a read operation matches a write back address associated with a previous write back operation, the logic circuit adapted to store the one or more data values at the local memory in response to determining that the read address matches the write back address and the logic circuit adapted to store the one or more data values at a memory external to the execution unit, wherein the logic circuit is further adapted to provide to the execution unit the one or more data values stored at the memory external to the execution unit without the one or more data values stored at the memory external to the execution unit passing through the local memory.

17. The multi-threaded processor of claim 16, wherein the logic circuit is adapted to read data from a memory location of the memory external to the execution unit, the memory location corresponding to the read address when the read address does not match the write back address.

18. The multi-threaded processor of claim 16, wherein the execution unit comprises a plurality of execution stages including a write back stage, a decode stage, and a read register file stage.

19. The multi-threaded processor of claim 18, wherein the logic circuit comprises one or more comparators, the one or more comparators adapted to compare read address information to write address information and to produce a result to selectively enable data forwarding.

20. The multi-threaded processor of claim 16, wherein the local memory comprises one or more data latches within the execution unit.

21. The multi-threaded processor of claim 20, wherein the one or more data latches are selectively activated by data forwarding logic circuitry to selectively enable data forwarding.

22. The multi-threaded processor of claim 16, further comprising a second logic circuit adapted to determine a memory address within a multi-way cache memory without performing a tag array lookup operation when at least a portion of a read address associated with an instruction matches a portion of a read address associated with a previous instruction.

23. A processor comprising:
   means for comparing a write identifier associated with a result to be written to a register file from execution of a first packet of instructions to a read identifier associated with a second packet of instructions at an execution pipeline within an interleaved multi-threaded (IMT) processor having multiple execution units;
   means for writing the result to the register file;
   means for storing the result locally at an execution unit in response to determining that the write identifier matches the read identifier; and
   means for providing the result written to the register file to an execution unit to use in connection with execution of the second packet of instructions, wherein the result written to the register file is provided from the register file to the execution unit without passing through the means for storing the result locally.

24. The processor of claim 23, further comprising:
   means for determining a second address associated with the second packet of instructions from a first address associated with the first packet of instructions;
   means for examining a carry bit of an adder of a data unit to determine whether the second address crossed a cache line boundary of a cache line associated with a multi-way cache; and
   means for converting a virtual address to a physical address associated with the multi-way cache using locally stored physical address data and way data associated with the first address without accessing a translation look-aside buffer (TLB) or a tag array.

25. The processor of claim 23, wherein the means for comparing a write identifier associated with a result to be written to a register file from execution of a first packet of instructions to a read identifier associated with a second packet of instructions comprises:
   a first comparator adapted to receive the write identifier and the read identifier and to provide a first output indicating whether the write identifier and the read identifier match;
   a second comparator adapted to receive the write identifier and a second read identifier and to provide a second output indicating whether the write identifier and the second read identifier match; and
   a logic circuit adapted to selectively provide one of locally stored data or register data to the execution unit for use in executing the second packet of instructions based on the first output and the second output.

26. A non-transitory computer-readable medium including program code that, when executed by a processor, causes the processor to:
   during a write back stage at an execution unit of a plurality of execution units, compare a write identifier associated with a result from an execution of a first instruction to a read identifier associated with a second instruction at an execution pipeline within an interleaved multi-threaded (IMT) processor that includes the plurality of execution units;
   store the result at a register file; and
   store the result at a local memory of the execution unit in response to determining that the write identifier matches the read identifier, wherein the result stored at the register file is provided from the register file to the execution unit without passing through the local memory.

27. A non-transitory computer-readable medium including program code that, when executed by a processor, causes the processor to:
   determine a second address associated with a second packet of instructions from a first address associated with a first packet of instructions;
   examine a carry bit of an adder of a data unit to determine whether the second address crossed a boundary of a cache line associated with a multi-way cache;
   in response to determining the second address crossed the boundary of the cache line associated with the multi-way cache, examine a second carry bit of the adder of the data unit to determine whether the second address crossed a boundary of a page associated with the multi-way cache; and in response to determining the boundary of the cache line is not crossed, access the multi-way cache to retrieve data from the second address using tag array data and translation look-aside buffer (TLB) lookup data associated with the first address that was determined from a previous tag array lookup operation.

* * * * *